US009148307B2

United States Patent
Choi et al.

(10) Patent No.: US 9,148,307 B2
(45) Date of Patent: Sep. 29, 2015

(54) SYSTEM AND METHOD OF HANDOVER DECISION FOR INTER RAT HANDOVER

(75) Inventors: Sung Ho Choi, Suwon-si (KR); Rajavelsamy Rajadurai, Bangalore (IN)

(73) Assignee: Samsung Electronics Co., Ltd (KR)

( * ) Notice: Subject to any disclaimer, the term of this patent is extended or adjusted under 35 U.S.C. 154(b) by 956 days.

(21) Appl. No.: 12/810,439

(22) PCT Filed: Dec. 24, 2008

(86) PCT No.: PCT/KR2008/007668
§ 371 (c)(1),
(2), (4) Date: Jun. 24, 2010

(87) PCT Pub. No.: WO2009/082172
PCT Pub. Date: Jul. 2, 2009

(65) Prior Publication Data
US 2010/0291933 A1    Nov. 18, 2010

(30) Foreign Application Priority Data

Dec. 24, 2007  (IN) .......................... 3081/CHE/2007

(51) Int. Cl.
| H04W 36/00 | (2009.01) |
| H04L 12/66 | (2006.01) |
| H04W 36/14 | (2009.01) |
| H04W 36/30 | (2009.01) |

(52) U.S. Cl.
CPC ........... *H04L 12/66* (2013.01); *H04W 36/0016* (2013.01); *H04W 36/14* (2013.01); *H04W 36/30* (2013.01)

(58) Field of Classification Search
CPC ..... H04W 80/04; H04W 24/00; H04W 36/30; H04W 36/18; H04W 36/08; H04W 36/14; H04W 36/12; H04L 12/66

USPC ........... 455/436, 437, 552.1, 553.1, 424, 434, 455/439, 438; 370/331, 335, 332
See application file for complete search history.

(56) References Cited

U.S. PATENT DOCUMENTS

| 6,041,235 | A  | * | 3/2000 | Aalto ............................ 455/437 |
| 2004/0121777 | A1 |   | 6/2004 | Schwarz et al. |
| 2004/0147262 | A1 | * | 7/2004 | Lescuyer et al. .............. 455/434 |
| 2004/0228491 | A1 |   | 11/2004 | Wu |
| 2005/0073977 | A1 |   | 4/2005 | Vanghi et al. |
| 2005/0107085 | A1 |   | 5/2005 | Ozluturk |
| 2005/0153743 | A1 | * | 7/2005 | Berra et al. .................... 455/560 |
| 2007/0026861 | A1 | * | 2/2007 | Kuhn et al. .................... 455/436 |
| 2007/0218903 | A1 |   | 9/2007 | Grech |
| 2008/0014957 | A1 | * | 1/2008 | Ore ............................ 455/452.1 |
| 2008/0293419 | A1 | * | 11/2008 | Somasundaram et al. .... 455/437 |

OTHER PUBLICATIONS

PCT/ISA/237 Written Opinion issued in PCT/KR2008/007668 (4pp).

* cited by examiner

*Primary Examiner* — Mahendra Patel
(74) *Attorney, Agent, or Firm* — The Farrell Law Firm, P.C.

(57) ABSTRACT

The invention relates to the field of mobile communication systems. In particular, the invention discloses a method for handover decision making during an inter-radio access technology (RAT) handover. According to the method, the decision for inter-RAT handover may be taken by the serving network entity in a hierarchical manner beginning with a radio access network (RAN) entity and proceeding towards a core network (CN) entity. Further, the serving network entity may take the decision for the inter-RAT handover based on the information and knowledge of the target access system handover criteria and the ranking available in the network entity.

13 Claims, 4 Drawing Sheets

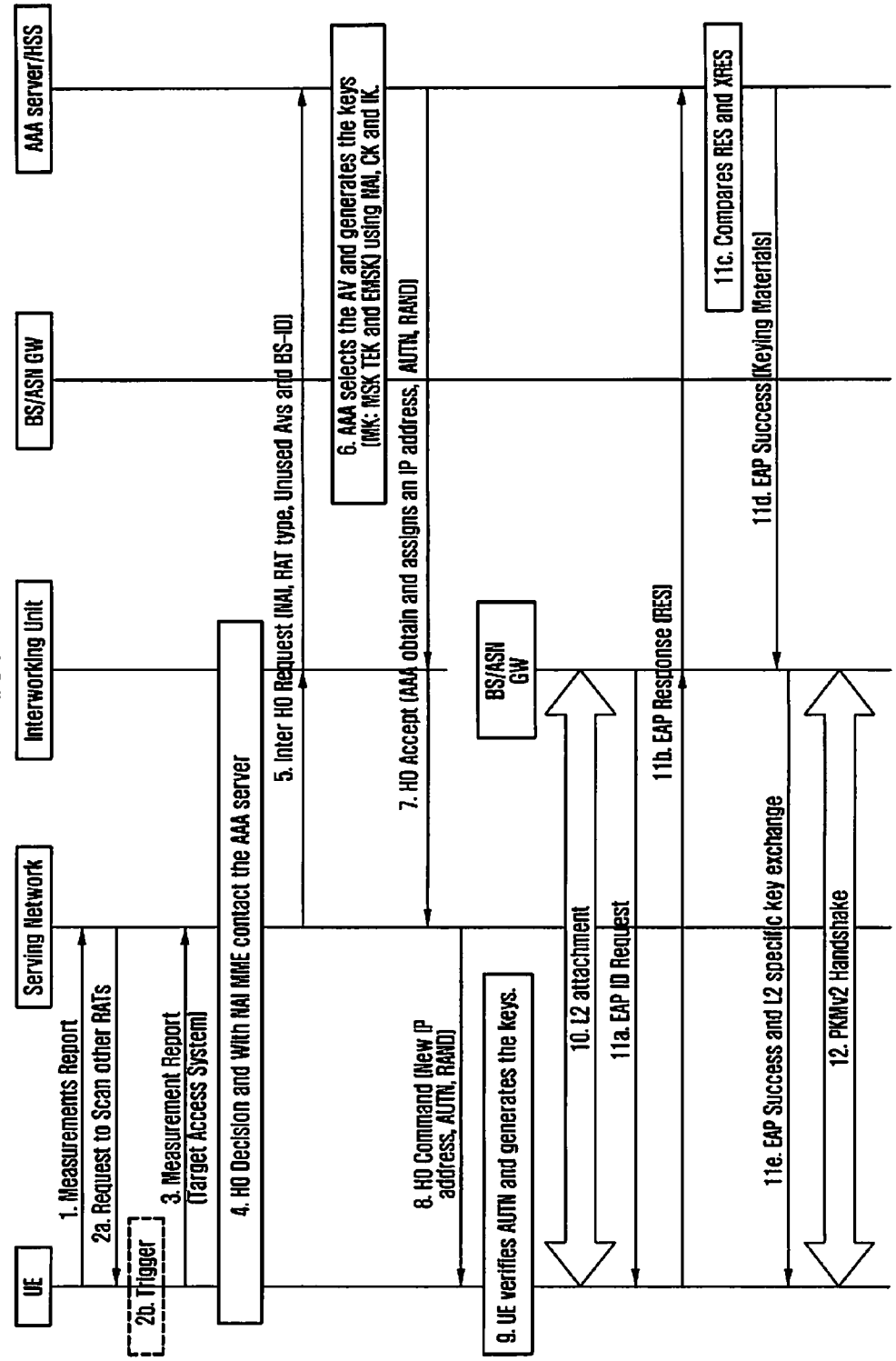

SYSTEM AND METHOD OF HANDOVER DECISION FOR INTER RAT HANDOVER

PRIORITY

This application claims priority under 35 U.S.C. §119(a) to an application filed in India on Dec. 24, 2007, assigned Serial No. 3081/CHE/2007, and under 35 U.S.C. §365 to application PCT/KR2008/007668 filed Dec. 24, 2008, the entire disclosures of both applications are incorporated herein by reference.

TECHNICAL FIELD

The present invention, in general, relates to the field of Heterogeneous mobile communication systems. Further, this invention relates to handover decision making procedure during Inter access system or radio access technology handovers. More specifically, this invention provides a method of deciding the inter-RAT HO by the serving network entity through hierarchical manner, based on, the information of the target access system handover criteria and the capability in assess the target access system measurement report and ranking, available in the network entity to decide on the handover. This invention encompasses method to decide the target access system for inter RAT handover. More particularly, the present invention relates to a system and method of handover decision for inter RAT handover.

BACKGROUND ART

The radio access network (RAN), system architecture (SA) and the core terminal (CT) working groups of the third generation partnership project (3GPP) aim to develop an enhanced UTRAN (E-UTRAN) architecture for next generation wireless systems. The E-UTRAN system is required to co-exist with the current second (2G), third generation (3G) wireless systems and non-3GPP networks namely cdma2000 and WiMAX and in particular, support handovers between the existing systems and the newly evolved E-UTRAN system, specified in the 3GPP TR 23.882, 3GPP TS 23.401 and 3GPP TS 23.402.

The E-UTRAN system is an evolution of the 3GPP UTRAN system, in which the main entities are the user equipment (UE), the enhanced Node B (ENB), Mobility Management Entity (MME), serving gateway and PDN GW as shown in the FIG. 1. The ENB of the EUTRAN system is expected to have the features of the Node B and the radio network controller (RNC) of the legacy UTRAN system. MME of the System Architecture Evolution (SAE) manages and stores UE context (for idle state: UE/user identities, UE mobility state, user security parameters). It generates temporary identities and allocates them to UEs. It checks the authorization whether the UE may camp on the TA or on the PLMN. It also authenticates the user. Serving gateway of SAE terminates for idle state UEs the downlink data path and triggers/initiates paging when downlink data arrive for the UE. PDN GW is the user plane anchor for mobility between different access systems. It performs or supports handover between different access systems.

The GERAN consists of the Base Transceiver Station (BTS) and the Base Station Controller (BSC). The UTRAN consists of the Node B and the Radio Network Controller (RNC). The GPRS Core Network consists of the Serving GPRS Support Node (SGSN) and the Gateway GPRS Support Node (GGSN) as shown in FIG. 1.

The integrated WLAN (I-WLAN) system specified in the 3GPP TS 23.234 specifications provides a system and method to integrate legacy UTRAN systems with WLAN systems. The I-WLAN system allows WLAN users to access 3GPP packet switched services.

The concept of a serving network entity taking a decision for the inter-RAT handover has been disclosed in the patent application US 2007/0218903. However, the patent application does not mention handover decision based on target access system handover criteria, information related to target access system ranking, and the capability to assess target access system signal measurement reports. Further, the patent application also does not explicitly mention that the decision of handover is being taken in a hierarchical manner.

DISCLOSURE OF INVENTION

Technical Problem

Currently there is no efficient mechanism specified to make handover decision between the heterogeneous access systems namely between SAE, I-WLAN, WiMAX and UMTS. Also the RAN entities or the network work entities which takes handover decision for intra RAT handover may not be capable of making inter RAT handover decisions due to lack of target access system specific handover criteria and ranking information unavailable in it.

Advantageous Effects

The advantages of the invention are:
Propose an efficient mechanism to make handover decision between the heterogeneous access systems namely between SAE, I-WLAN, WiMAX and UMTS. Also the RAN entities or the network work entities which takes handover decision for intra RAT handover may not be capable of making inter RAT handover decisions due to lack of target access system specific handover criteria and ranking information unavailable in it. So by escalating the handover decision to the higher level nodes, reduces handover failures.

BRIEF DESCRIPTION OF THE DRAWINGS

FIG. 4 depicts Sequence of the message flow for HO decision making for Handover from the LTE/SAE to the WiMAX access system.

MODE FOR THE INVENTION

The invention relates to the field of mobile communication systems. In particular, the invention discloses a method for handover decision making during an inter-radio access technology (RAT) handover. According to the method, the decision for inter-RAT handover may be taken by the serving network entity in a hierarchical manner beginning with a radio access network (RAN) entity and proceeding towards a core network (CN) entity. Further, the serving network entity may take the decision for the inter-RAT handover based on the information and knowledge of the target access system handover criteria and the ranking available in the network entity.

The primary object of the invention is to provide a method by which the serving network decides the Inter-RAT HO through hierarchical manner (starting from RAN network entity) based on the target access system specific handover criteria and ranking information present in the network entity to decide the handover.

Accordingly the invention explains a method by which an inter-RAT handover decision is taken by the serving network entity through hierarchical manner starting from RAN network entity towards the core network entity, based on the knowledge and information of the target access system handover criteria and ranking available in the network entity to decide on the handover.

Accordingly the invention also explains a system by which an inter-RAT handover decision is taken by the serving network entity through hierarchical manner starting from RAN network entity towards the core network entity, based on the information of the target access system handover criteria and ranking available in the network entity to decide on the handover.

The preferred embodiments of the present invention will now be explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

The present invention provides a system and method for the inter-RAT handover decision, is taken by the serving network entity through hierarchical manner starting from RAN network entity towards the core network entity, based on the information of the target access system handover criteria and ranking available in the network entity and may also the capability to assess the measurement report to decide on the handover.

The invention is operated as detailed below:

HO Decision Making in Heterogeneous Wireless Access Systems—

Figure 1:
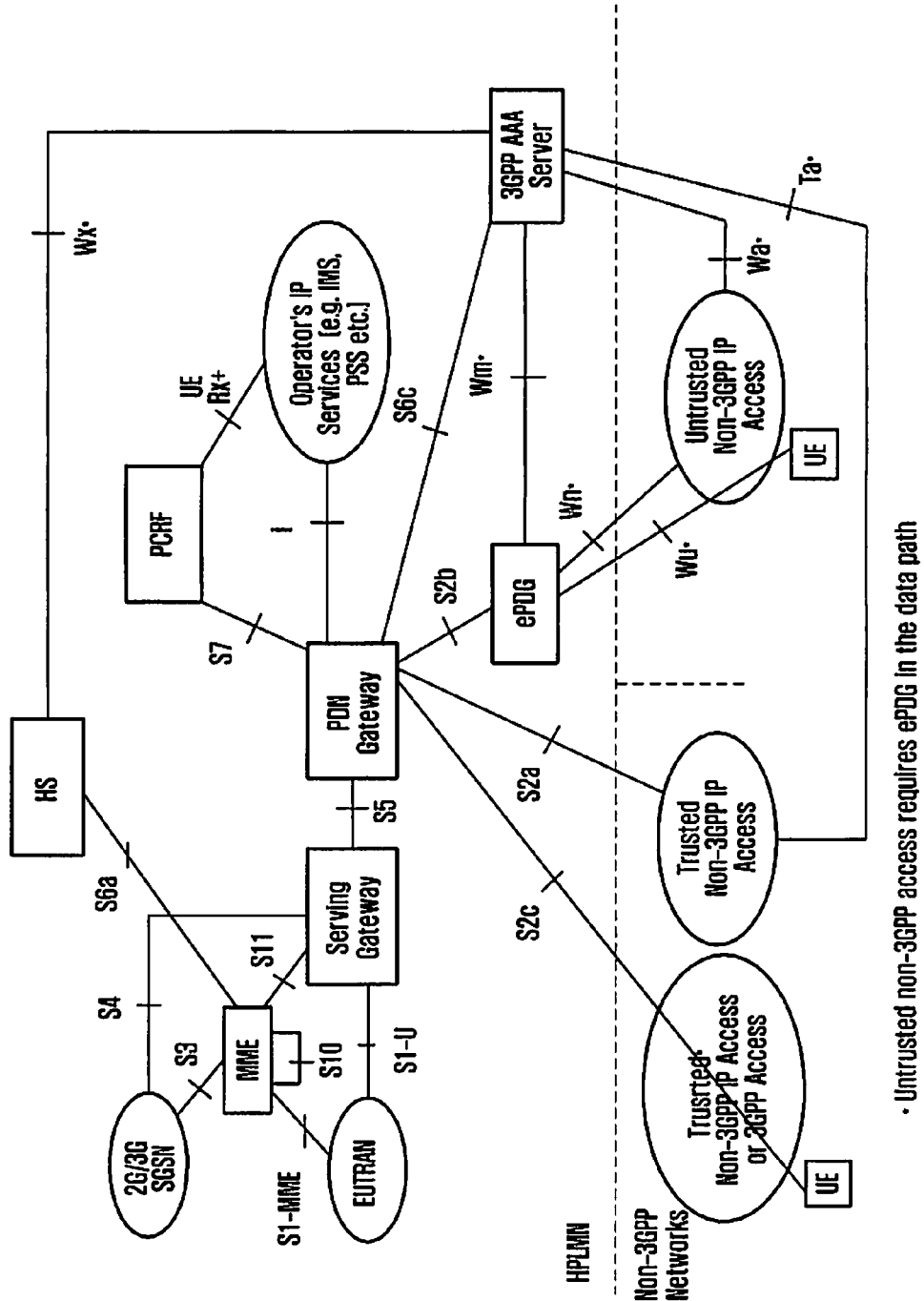
FIG. 1 depicts The Logical high level architecture for the evolved system.
Figure 2:
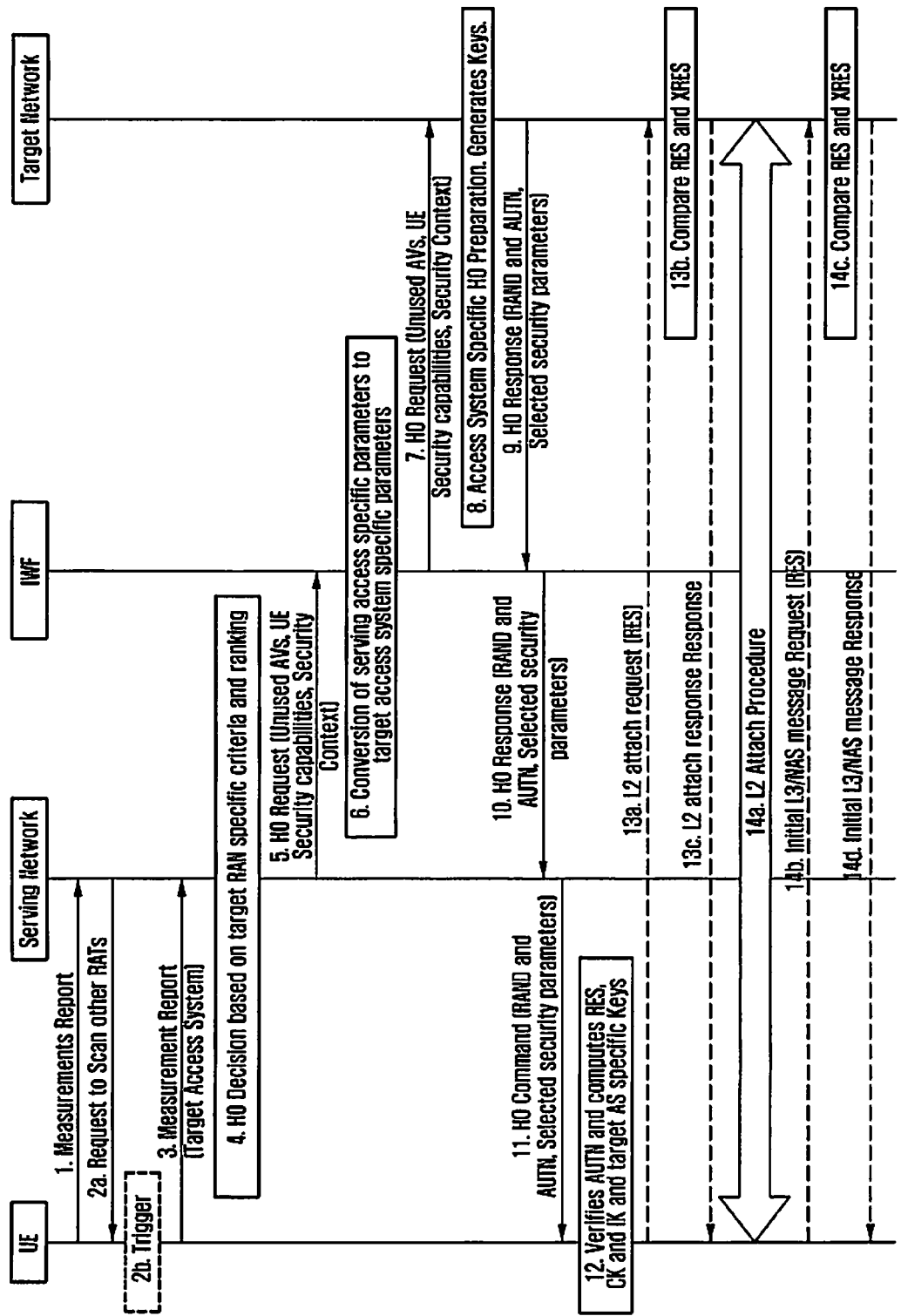
FIG. 2 depicts Sequence of the message flow for HO decision making by the serving network.

The generalized handover decision making in heterogeneous wireless access systems is shown in FIG. 2. In this alternative, the serving network initiates the backward handover procedure. The functionality of the interworking function (IWF) or interworking unit (IWU) is to convert the RAN and the CN containers/protocol/parameters of one access system to another. IWF interface with different network entities, with the entity specific interface protocol. The IWF can be co-located with any other network entity in the serving network or in the target network or alternatively can be a separate entity in the serving network or in the target network. The operation of the handover decision making is detailed below:

1. UE sends periodic or event based measurements to the serving access network.
2. If the serving access system finds that UE measurement is below the threshold or serving access system decides by any other mean that serving RAT cannot be continued, then the serving access system can request the UE to start scanning other RATs or alternatively by L2 or by some other means, the UE decides that the serving RAN cannot be continued and starts scanning the other RATs.
3. The UE send the measurement report of the other RAT to the serving access network.
4. The serving access network decided the target system based on the measurement report compared with the RAT specific handover criteria and ranking orders configured in the serving network. The serving access system decides the inter-RAT HO in a hierarchical manner starting from RAN network entity towards the core network entity based on the information of the target access system handover criteria and ranking available in the network entity and may also the capability to assess the measurement report to decide the HO.
5. The serving network checks for the capabilities and authorizes the UE requested handover. The serving network initiates the backward handover procedure by sending handover request message to the target network through the IWF. The serving network includes the unused AVs, the security context of the UE, etc., along with the HO request message.
6. The IWF converts the serving access network specific parameters to the target specific parameters and forwards the request to the target network.
7. The IWF lookup the target system parameters in the HO request message and forwards the HO request to the appropriate target access system entity.
8. The target system then prepares for the UE handover using the HO request parameters. The target network selects the first AV from the ordered AVs received in the HO request message and derives access system specific keys from the CK and IK of the selected AV.
9. After successful HO preparation the target system sends HO response message to the IWF. The target system includes the target system related parameters like entity ID and/or IP address, selected security configuration and the RAND and AUTN from the selected AV along with the HO response.
10. The IWF then converts the parameters according to the serving system specific parameters and forwards the HO response to the serving network.
11. The serving network sends the HO command to the UE to perform the handover to the target access system. Then the UE initiate L2 connectivity to the target system.
12. The UE verifies the AUTN and computes the RES, CK and IK and generates target access system specific keys.
13. The UE optionally
    a. Passes the RES in the L2 attachment request message.
    b. The target network compares the RES and the XRES. If they match, then the target system considered the authentication and key agreement exchange to be successfully completed.
    c. Then the target system sends the L2 attachment response.
14. Or alternatively to the step 13,
    a. The UE does the L2 attachment procedure
    b. Then during the initial L3 or NAS message, the UE passes the computed RES along with the initial L3 or NAS request message.
    c. The target network compares the RES and the XRES. If they match, then the target system considered the authentication and key agreement exchange to be successfully completed.
    d. Then the target system sends the initial L3 or NAS response message.

Figure 3:
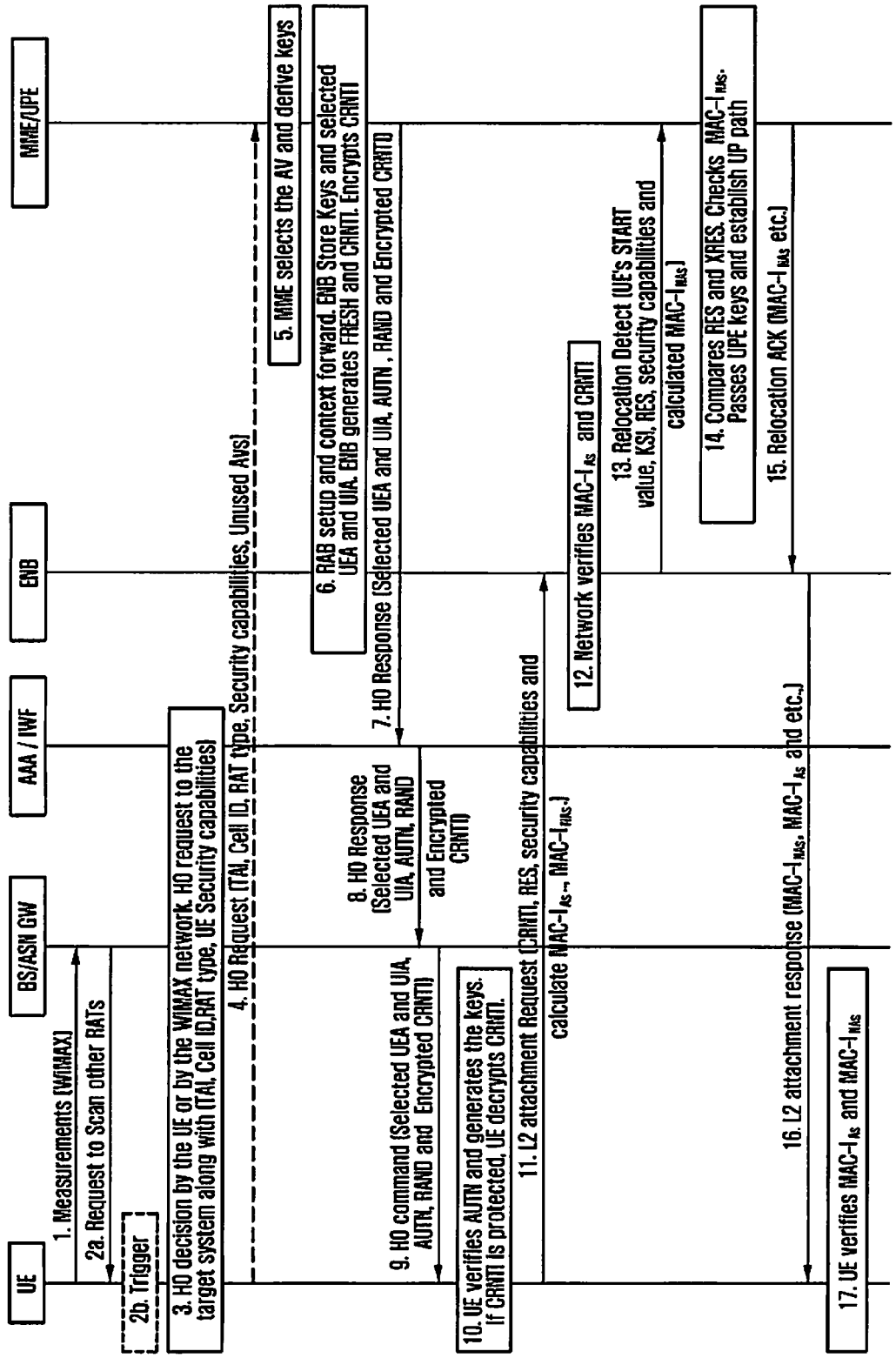
FIG. 3 depicts Sequence of the message flow for HO decision making for Handover from the WiMAX to the LTE/SAE access system.

Illustrated example for Handover Decision making from the WiMAX to the LTE/SAE access system as shown in FIG. 3:

1. The UE sends periodic or event based measurements to the WiMAX network.

2. If the UE or the WiMAX network finds that UE measurement is below the threshold or the WiMAX network decides by any other mean that WiMAX RAN cannot be continued, then the WiMAX network can request the UE to start scanning other RATs or alternatively by L2 or by some other means, the UE decides that the serving RAN cannot be continued and starts scanning the other RATs.

3. The UE or alternatively the WiMAX decides that the target system as LTE/SAE based on the LTE/SAE measurement report compared with the RAT specific handover criteria and ranking orders configured in the UE or in the WiMAX network. In case of the WiMAX network decides the handover, the decision to handover the UE to the LTE system is taken in hierarchical manner by the WiMAX network. That is, WiMAX network decides the target system as LTE/SAE in the BS or in the network entity in the ASN or in the network entity in the CSN or in the IWF/IWU in hierarchical manner starting from Base Station based on the information of the target access system handover criteria and ranking available in the network entity and may also the capability to assess the measurement report to decide the HO.

4. The UE or alternatively the WiMAX initiates the backward handover procedure by sending handover request message to the LTE/SAE network through the WiMAX network. The UE includes the UE security capabilities, TAI, cell ID, Indiation of Inter RAT HO, serving and target RATs, etc. The AAA server includes the unused AVs. The IWF function then forwards the HO Request to the MME through the interface specific protocol. The IWF obtains the IP address of the MME by resolving TAI or alternatively the IWF have the mapping of TAI to the MME.

5. The MME decides the target ENB and selects the first AV from the ordered AVs received in the HO request message. The MME then derives the LTE/SAE specific keys and prepares for the UE HO.

6. The MME passes the security context to the target ENB and setup the RAB for the UE. The ENB generates the RAN specific temp ID CRNTI and pass it to the MME. The MME encrypts the temp identity CRNTI.

7. After successful HO preparation the MME sends HO response message to the IWF. The MME includes the target system related parameters like ENB ID(s), selected security configuration parameters, the RAND and AUTN of the selected AV and the encrypted temp ID CRNTI along with the HO response.

8. The IWF then converts the parameters according to the serving system specific parameters and forwards the HO response to the UE through AAA, ASN GW and BS.

9. The BS or the ASN GW sends the HO command to the UE. The HO commend includes target system related parameters like ENB ID(s), selected security configuration parameters, the RAND and AUTN of the selected AV and the encrypted temp ID CRNTI.

10. Then the UE the AUTN and derives the keys CK and IK. Also the UE generates the keys specific to the LTE/SAE system and decrypts the assigned CRNTI.

11. The UE initiates the L2 attachment procedure with the target BS. The UE includes the derived RES, assigned CRNTI, security capabilities and the MAC-I of NAS and the AS message part.

12. The BS verifies the MAC-I on the AS part and also verify the CRNTI assigned to the UE.

13. The BS then sends the Relocation detect message to the MME. The Relocation detect message includes the RES, security capability and security related parameters and also the UE calculated MAC-I NAS.

14. The MME compares the RES with the XRES and verifies the MAC-I on the NAS part and establish the UP path.

15. Then the MME sends Relocation ACK message to the ENB. The MME includes the MAC-I on the NAS part along with the Relocation ACK message part.

16. The ENB sends the L2 attachment response message to the UE. The ENB includes the MAC-I on the NAS part and calculates and includes the MAC-I on the AS part along with the L2 attachment response message.

17. The UE verifies the MAC-I NAS and MAC-I AS.

Illustrated example for Handover Decision making from the LTE/SAE to the WiMAX access system as shown in FIG. 4:

1. The UE sends periodic or event based measurements to the EUTRAN network.

2. If ENB/MME finds that UE measurement is below the threshold or MME decides by any other mean that EUTRAN cannot be continued, then ENB/MME can request the UE to start scanning other RATs or alternatively by L2 or by some other means, the UE decides that the EUTRAN cannot be continued and starts scanning the other RATs.

3. UE sends the WiMAX measurement report containing the BS ID and NAI with other parameters to the SAE system. Then the SAE decides to handover the UE to the WiMAX network. The decision to handover to the WiMAX is taken in the ENB or in the MME or in the Interworking Function (IWF) in hierarchical manner starting from ENB based on the information of the target access system handover criteria and ranking available in the network entity to decide the HO.

4. Using NAI, the MME resolves the SAE AAA server IP address and contacts the AAA server through the logical interworking unit. This logical interworking unit can be located within the MME or within the AAA server or alternatively co-located within any network entity in the SAE system or in the WiMAX system. The functionality of the interworking unit is to convert the RAN and the CN containers/protocol/parameters of one access system to another.

5. The MME send the HO request to the AAA server through the interworking unit. The HO request contains the NAI, BS ID, Unused AVs and other parameters.

6. The AAA server selects the first AV from the ordered AVs received in the HO request message and derives access system specific keys from the CK and IK of the selected AV. AAA generates/derive the keys (MSK, TEK and EMSK) using NAI, CK and IK.

7. The AAA server sends the HO accept to the MME through the interworking unit. The HO accept message contains the RAND and AUTN of the selected AV.

8. The MME forwards the received parameters in the HO accept message in the HO command message to the UE.

9. After receiving the HO command from the SAE system to handover to the WiMAX network, the UE verifies the AUTN and derives the keys CK and IK.

10. The UE starts the L2 attachment with the WiMAX BS.

11. a. The BS/ASN-GW sends the EAP ID request message to the UE for authentication.

b. Then the UE sends the RES derived in the EAP Response message and optionally intimate that the UE uses the optimization mechanism. The WiMAX ASN passes the messages to the AAA server.

c. The AAA server compares the RES with the XRES.

d. If the comparison is successful then the AAA server sends the EAP success message to the WiMAX ASN which includes keying materials for WiMAX.

e. The WiMAX ASN receives the EAP success message and also the keying materials. Then the WiMAX ASN derives the L2 specific keying material and sends it to the UE along with EAP success message.

12. The UE initiate the PKMv2 handshake procedure.

The main inventive concept of this invention is to provide a method by which the serving network decides the Inter-RAT HO through hierarchical manner (starting from RAN network entity) based on the target access system specific handover criteria and ranking information present in the network entity to decide the handover.

GLOSSARY OF TERMS AND THEIR DEFINITIONS

3GPP: 3rd Generation Partnership Project
3GPP2: 3rd Generation Partnership Project 2
AAA: Authentication, Authorization and Accounting
APN: Access Point Name
AS: Access System
AV: Authentication Vector
AuC: Authentication Center
Backward handover: The source RAN node initiates the handover, and resources are prepared in the target RAN Nodes. Examples of backward handover concept are reported in TR 25.931.
BTS: Base Transceiver Station
BSC: Base Station Controller
CK: Cipher Key
ENB: Evolving Node B
Forward handover: The UE changes to the target RAN node without any preparation in the network. Examples of this concept are reported in TR 25.931
GERAN: GSN EDGE Radio Access Network consisting of the BTS and BSC
GGSN: Gateway GPRS Support Node
GPRS: Generalized Packet Radio Services
HA: Home Agent, a router on a mobile node's home network that tunnels packets to the mobile node while it is away from home.
HLR: Home Location Register
HO: Handover
HSS: Home Subscription Server
IMS: IP Multimedia Service
*IK: Integrity Key
IP: Internet Protocol
IP Sec: Internet Protocol Security
Inter AS MM: Inter Access System Mobility Manager, an entity assisting in mobility across access systems
IWF/IWU: Interworking Function or Interworking Unit. IWF and IWU are same and interchangeable.
L2: Layer 2
L3: Layer 3
LTE: Long Term Evolution
MIP: Mobile Internet Protocol includes version 4 and version 6
MME: Mobility Management Entity
MSC: Mobile Switching Center
NAI: Network Address Identifier;
Node B: The base station in a UMTS network
PCF: Packet Control Function
PCRF: Policy and Charging Rules Function
PDP: Packet Data Protocol
PDSN: Packet Data Serving Node
prf: pseudo-random function
QoS: Quality of Service
RAT: Radio Access Technology
RNC: Radio Network Controller
RO: Route Optimization (in MIP)
RRC: Radio Resource Control
SAE: System Architecture Evolution
SGSN: Serving GPRS Support Node
UE: User Equipment
UMTS: Universal Mobile Telecommunication System
UPE: User Plane Entity
User terminal: the end user equipment e.g., the Mobile Station (MS) or User Equipment (UE).
UTRAN: UMTS Terrestrial Radio Access Network consisting of the Node B and the RNC.

The invention claimed is:

1. A method for making a handover decision in an inter Radio Access Technology (RAT) communication system, the method comprising:
    scanning, by a User Equipment (UE), communication of an other RAT communication system and preparing a measurement report;
    sending to a serving network, by the UE, the measurement report of the other RAT communication system;
    determining, by the serving network, a handover of the UE based on an information of the target network handover criteria and ranking information available in a network entity;
    sending, by the serving network, a handover request to an Inter Working Unit (IWU) in response to handover decision;
    converting, at the IWU, serving network specific parameters to a target specific parameter;
    forwarding, by the IWU, the handover request to a target network;
    preparing, at the target network, for handover of the UE using handover request parameters;
    sending, from the target network to the serving network, a handover response message; and
    sending a handover command to the UE to perform handover,
    wherein the target network computes an Integrity Key (IK), a Cipher Key (CK) and an Authentication Response (RES), and
    wherein the handover response message includes a Random Challenge (RAND), an Authentication Token (AUTN) and selected security parameters including a Key Set Identifier (KSI).

2. The method of claim 1, wherein the scanning by the UE is an event based communication.

3. The method of claim 1, wherein the target network selects a first authentication vector from ordered authentication vectors received in the handover request message.

4. The method of claim 3, wherein the target network verifies parameters of the handover request message and target network specific keys are generated at the UE.

5. An Interworking Unit (IWU) for making a handover decision in an inter Radio Access Technology (RAT) communication system, the IWU comprising:
    a transceiver configured to transmit and receive signals; and
    a controller configured to receive a handover request message from a serving network, to convert serving network parameters to a target specific parameter, to forward the handover request message to a target network, and to send a handover response message to the serving network when receiving a handover response message from the target network,
    wherein the controller receives the handover request message when the handover is determined based on an information of the target network handover criteria and ranking information available in a network entity by the serving network, wherein an Integrity Key (IK), a Cipher Key (CK) and an Authentication Response (RES) are computed by the target network, and wherein the handover response message includes a Random Challenge (RAND), an Authentication Token (AUTN) and selected security parameters including a Key Set Identifier (KSI).

6. The IWU of claim 5, wherein the handover request message comprises a security context of the UE.

7. The IWU of claim 5, wherein the handover response message comprises a Random Challenge (RAND), an Authentication Token (AUTN) and selected security parameters including a Key Set Identifier (KSI).

8. A method for making a handover decision of an Interworking Unit (IWU) in an inter Radio Access Technology (RAT) communication system, the method comprising:

receiving a handover request message from a serving network;

converting serving network parameters to a target specific parameter;

forwarding the handover request message to a target network; and sending a handover response message to the serving network if a handover response message is received from the target network, wherein the IWU receives the handover request message if the handover is determined based on an information of the target network handover criteria and ranking information available in a network entity by the serving network, wherein an Integrity Key (IK), a Cipher Key (CK) and an Authentication Response (RES) are computed by the target network, and wherein the handover response message includes a Random Challenge (RAND), an Authentication Token (AUTN) and selected security parameters including a Key Set Identifier (KSI).

9. The method of claim 8, wherein the handover request message includes a security context of the UE.

10. A serving network entity for making a handover decision in an inter Radio Access Technology (RAT) communication system, the serving network entity comprising:

a transceiver configured to transmit and receive signals; and a controller configured to receive a measurement report of an other RAT communication system from a User Equipment (UE), to determine a handover of the UE based on information of a target network handover criteria and a ranking information available in a network entity, to send a handover request to an Inter Working Unit (IWU) if the handover of the UE is determined, and to send a handover command to the UE if a handover command is received from the IWU, wherein serving network specific parameters are converted to a target specific parameter by the IWU, wherein an Integrity Key (IK), a Cipher Key (CK) and an Authentication Response (RES) are computed by the target network, and wherein the handover response message includes a Random Challenge (RAND), an Authentication Token (AUTN) and selected security parameters including a Key Set Identifier (KSI).

11. The method of claim 10, wherein the handover request message comprises a security context of the UE.

12. A method for making a handover decision of a serving network entity in an inter Radio Access Technology (RAT) communication system, the serving network entity comprising:

receiving a measurement report of an other RAT communication system from a User Equipment (UE);

determining a handover of the UE based on information of a target network handover criteria and a ranking information available in a network entity;

sending a handover request to an Inter Working Unit (IWU) when the handover of the UE is determined; and sending a handover command to the UE if a handover command is received from the IWU, wherein serving network specific parameters are converted to a target specific parameter by the IWU, wherein an Integrity Key (IK), a Cipher Key (CK) and an Authentication Response (RES) are computed by the target network, and wherein the handover response message includes a Random Challenge (RAND), an Authentication Token (AUTN) and selected security parameters including a Key Set Identifier (KSI).

13. The serving network entity of claim 12, wherein the handover request message comprises a security context of the UE.

* * * * *